United States Patent Office 2,725,397
Patented Nov. 29, 1955

2,725,397

UREA COMPOSITIONS

Derek Jan Dijksman and Ian Alexander McArthur, Norton-on-Tees, England, assignors to Imperial Chemical Industries Limited, a corporation of Great Britain No Drawing. Application May 29, 1953,
Serial No. 358,525

Claims priority, application Great Britain June 25, 1952

8 Claims. (Cl. 260—555)

This invention relates to urea compositions.

Urea and compositions containing it have, in general, the disadvantages that they do not flow or run freely except when thoroughly dry and even when thoroughly dried they quickly lose their free flowing properties and tend to cake in storage.

The property of freedom to flow is important in urea and in compositions thereof which are to be mixed with other materials or are to be conveyed or otherwise handled and is also of importance when the composition is to be used as a fertilizer, because it affects the strewing, either mechanically or by hand and consequently the distribution of the material on the land.

According to the present invention there is provided a free flowing and substantially non-caking composition of urea which comprises an intimate mixture of substantially crystalline urea and a minor quantity of basic magnesium carbonate.

Preferably the urea if necessary should be dried to a moisture content of less than about 1% before the basic magnesium carbonate is mixed therewith. Substantially crystalline urea produced by synthesis from ammonia and carbon dioxide is, in general, dried to a moisture content of the above order before leaving the synthesis plant and may therefore be used without further drying.

The basic magnesium carbonate used in the preparation of the composition of the present invention may be any usual commercial product in powder form which, in general, contains approximately equimolar proportions of magnesium carbonate and magnesium hydroxide together with water of crystallisation.

The quantity of basic magnesium carbonate employed will, it will be understood, depend upon various factors, such as the particle size of the urea and its moisture content. In general, however, it has been found that a quantity of basic magnesium carbonate within the range of ½% to 2% by weight of the urea is sufficient for good results. Preferably with urea having a moisture content as low as about 0.1% the quantity of basic magnesium carbonate added should be of the order of 1%.

The mixing of the urea and basic magnesium carbonate may be carried out in any suitable apparatus, for example, a paddle mixer, the mixing being continued until the particles of urea are substantially uniformly coated with the basic magnesium carbonate. When the urea used is obtained by evaporating and drying in a paddle drier, a melt obtained by synthesis from ammonia and carbon dioxide, it has been found convenient to add the basic magnesium carbonate to the urea in the paddle drier during the later stages of the drying operation.

However, the substantially dry crystalline urea may be continuously discharged from the drier into a paddle mixer into which the basic magnesium carbonate is also continuously added at the desired rate by suitable means. It has been found that in this way, using a paddle mixer of such dimensions that the residence time of the material in it is of the order of one to two minutes, there may be prepared at the rate of 30 to 37 tons per day, a urea composition containing on the average about 1% by weight of basic magnesium carbonate with a mean deviation of 0.25% by weight, and that the urea compositions so prepared remain free flowing even when stored in 1 cwt. bags stacked five high for a period of months, whereas untreated urea stored under exactly similar conditions becomes firmly caked.

We claim:

1. A free-flowing and substantially non-caking urea composition consisting of an intimate mixture of substantially crystalline urea and about 0.5% to 2% by weight of the urea of basic magnesium carbonate.

2. A urea composition as claimed in claim 1 in which the quantity of basic magnesium carbonate is about 1% by weight of the urea.

3. A process for the preparation of free-flowing and substantially non-caking urea compositions which consists in intimately mixing substantially crystalline urea with about 0.5% to 2% by weight of the urea of basic magnesium carbonate.

4. A process as claimed in claim 3 in which the urea is dried to a moisture content of less than 1% before the basic magnesium carbonate is mixed therewith.

5. A process for the preparation of free-flowing and substantially non-caking urea compositions which consists in evaporating and drying a melt obtained by synthesis from ammonia and carbon dioxide, adding towards the end of the drying process from ½% to 2% by weight of basic magnesium carbonate and continuing the mixing until the particles of urea are substantially uniformly coated with the basic magnesium carbonate.

6. A process for the preparation of free-flowing and substantially non-caking urea compositions which consists in the steps of forming a melt of urea by synthesis from ammonia and carbon dioxide, passing the melt into a paddle drier, evaporating and drying the melt in said drier to a moisture content of less than 1%, passing the resulting substantially dry crystalline urea into a paddle mixer, passing into said paddle mixer from ½% to 2% by weight of basic magnesium carbonate and mixing until the particles of urea are substantially uniformly coated with the basic magnesium carbonate.

7. The composition of claim 1, wherein the basic magnesium carbonate contains approximately equimolar proportions of magnesium carbonate and magnesium hydroxide.

8. The composition of claim 7, wherein the basic magnesium carbonate is about 1% by weight of the urea.

References Cited in the file of this patent

UNITED STATES PATENTS

| | | |
|---|---|---|
| 2,307,253 | Yee et al. | Jan. 5, 1943 |
| 2,369,110 | Harford | Feb. 6, 1945 |